United States Patent [19]

Tada et al.

[11] Patent Number: 5,296,267
[45] Date of Patent: Mar. 22, 1994

[54] PROCESS FOR PREPARING NON-AMALGAMATED ZINC ALLOY POWDER FOR ALKALI DRY CELLS

[75] Inventors: Kinya Tada; Masaaki Kurimura; Mutsumi Yano, all of Osaka; Eiichiro Mieno, Gunma; Wataru Sekiguchi, Gunma; Junzo Nakagawa, Gunma; Takanori Akazawa, Gunma, all of Japan

[73] Assignees: Toho-Aen Kabushikigaisha, Gunma; Sanyo-Ekuseru Kabushikigaisha; Sanyo-Denki Kabushikigaisha, both of Osaka, all of Japan

[21] Appl. No.: 729,145

[22] Filed: Jul. 12, 1991

[30] Foreign Application Priority Data

Jan. 22, 1991 [JP] Japan ............... 3-021697

[51] Int. Cl.⁵ ............... B22F 1/02
[52] U.S. Cl. ............... 427/216; 427/217; 75/351; 75/343; 428/570
[58] Field of Search ............... 75/351, 343; 428/570; 427/123, 189, 191, 216, 217

[56] References Cited

U.S. PATENT DOCUMENTS

| | | | |
|---|---|---|---|
| 1,294,001 | 2/1919 | Ward | 427/216 |
| 1,992,548 | 2/1935 | Short | 427/216 |
| 2,273,832 | 2/1942 | Carney et al. | 427/216 |
| 2,444,174 | 6/1948 | Tarr et al. | 204/56 |
| 2,853,398 | 9/1958 | Mackiw et al. | 427/217 |
| 2,853,401 | 9/1958 | Mackiw et al. | 427/217 |
| 2,853,403 | 9/1958 | Mackiw et al. | 427/216 |
| 2,942,052 | 6/1960 | Bourke et al. | 136/6 |
| 2,982,705 | 5/1961 | Sakano et al. | 204/148 |
| 3,427,203 | 2/1969 | Fletcher | 136/120 |
| 3,447,950 | 6/1969 | Evans et al. | 427/216 |
| 3,757,793 | 9/1973 | Foster et al. | 128/419 P |
| 4,144,382 | 3/1979 | Takeda et al. | 429/91 |
| 4,376,810 | 3/1983 | Takeda et al. | 429/90 |
| 4,500,614 | 2/1985 | Nagamine et al. | 429/206 |
| 4,735,876 | 4/1988 | Miura et al. | 429/206 |
| 4,820,552 | 4/1989 | Espinosa-C. et al. | 427/216 |

FOREIGN PATENT DOCUMENTS

| | | |
|---|---|---|
| 59-30550 | 2/1984 | Japan . |
| 59-30561 | 2/1984 | Japan . |
| 59-197197 | 9/1984 | Japan . |
| 59-197198 | 9/1984 | Japan . |

*Primary Examiner*—Donald P. Walsh
*Assistant Examiner*—Daniel Jenkins
*Attorney, Agent, or Firm*—Townsend & Banta

[57] ABSTRACT

Non-amalgamated zinc alloy powder is prepared by admixing zinc alloy powder with a predetermined amount of indium and heating the resulting mixture at temperature ranging from 160° C. to 200° C. in inert gas atmosphere.

6 Claims, 1 Drawing Sheet

PROCESS FOR PREPARING NON-AMALGAMATED ZINC ALLOY POWDER FOR ALKALI DRY CELLS

BACKGROUND OF THE INVENTION

1. Field of the Invention

The present invention relates to a process for preparing non-amalgamated zinc alloy powder for alkali dry cells and, more particularly, to a process for preparing non-amalgamated zinc alloy powder for alkali dry cells capable of being employed as an active material for an anode of the alkali dry cell.

2. Description of Related Art

Conventional zinc alkali dry cells have the problem in common that the zinc anode is corroded by an electrolytic solution during storage. In order to solve the problem as industrical means, hydrogen overvoltage is elevated by using amalgamated zinc powders containing approximately 5% to 10% by weight of mercury, thereby suppressing corrosion to such an extent as causing no practical problem.

Recently, however, as social demand has been increased, various research has been made in order to reduce mercury in the cell and combat with pollution. Nowadays, for instance, as disclosed in Japanese Patent Publication (kokoku) No. 42,114/1989, there has been employed zinc alloy powder containing approximately 0.6% by weight of mercury, which is prepared by amalgamating zinc alloy containing lead or aluminum with an indium-mercury alloy.

It is to be noted that, even if mercury has been reduced to the amount as low as approximately 0.6% by weight, mercury is still contained and the problem with environmental pollution cannot be said to be solved. Further, from the resource point of view, it is desired to reproduce zinc and so on from used dry cells, the mercury contained in the cells, whatever the amount of mercury is, causes the problem in reproduction steps.

SUMMARY OF THE INVENTION

Therefore, the present invention has the object to provide a process for preparing zinc alloy powder for alkali dry cells as adapted as to be prepared without amalgamation.

As a result of research, it has been found that non-amalgamated zinc alloy powder having excellent properties as an active anode material for alkali dry cells can be prepared by adding a predetermined amount of indium to zinc alloy powder in inert gas atmosphere and heating the zinc alloy powder at predetermined temperature.

Other objects, features and advantages of the present invention will become apparent during the course of the description of the preferred embodiments, which follows, with reference to the accompanying drawings.

DESCRIPTION OF THE PREFERRED EMBODIMENTS

Figure 1:
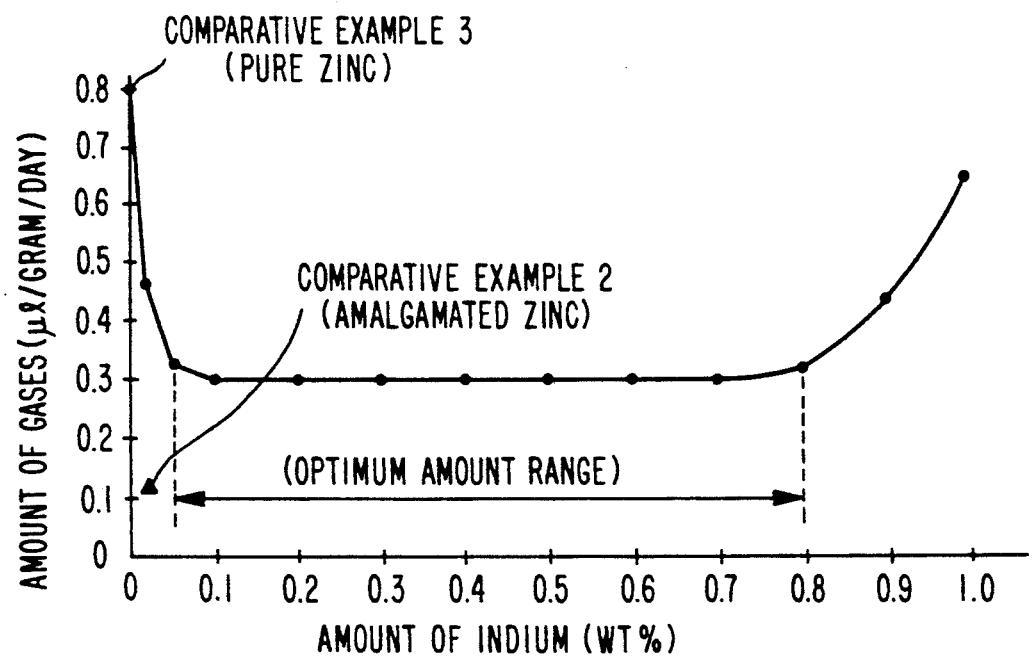
FIG. 1 is a graph showing the relationship between the amounts of gases generated in $\mu l$ per gram per day and the amount in % by weight of indium added.

In accordance with the process of the present invention, the addition of indium may be performed by dry method which involves charging a mixer equipped with a heating device with zinc alloy powder and indium particles, closing the mixer, reducing the atmosphere within the mixer to vacuum by suction, filling it with inert gas, admixing the zinc alloy powder with indium particles at temperature elevated to 160° C. to 200° C. for one hour, and cooling the mixture, thereby coating the zinc alloy particles with indium. It is noted herein that the melting point of indium is 156.4° C.

The amount of the indium to be added to the zinc alloy powder may preferably range from 0.05% to 0.80% by weight. When the indium is contained in the amount within the aforesaid range, on the one hand, it is considered that the generation of gases due to corrosion of the dry cell during storage is suppressed as a result of the elevation of the hydrogen overvoltage on the surface of the zinc alloy powder. When the amount of the indium exceeds the aforesaid range, on the other hand, the effect of suppressing the generation of the gases is lowered.

The temperature for heating the zinc alloy powder to which the indium has been added may preferably range from approximately 160° C. to 200° C. If the temperature would be lower than the lower limit, on the one hand, the surface of the zinc alloy powder is irregularly coated with the indium. If the temperature would be higher than the upper limit, on the other, the zinc alloy powder may be alloyed with the indium uniformly from its surface area up to its central portion, thereby reducing the concentration of the indium on the surface of the zinc alloy powder and consequently impairing good contact among the zinc alloy powder particles and leading to a rapid decrease in discharge performance as a cell.

Further, inert gases to be employed for the process according to the present invention may be an non-oxidizable gases including nitrogen, argon, etc.

It is to be noted that during the process according to the present invention the color of the zinc alloy powder being silvery white prior to charging turns slightly grayish and further zinc oxide is contained in the amount as low as 0.2% by weight or less. In other words, it is confirmed that the amount of zinc oxide is lower by 0.2% to 0.3% by weight than when there are employed gases other than such non-oxidizable gases, such as air. As a result, the non-amalgamated zinc alloy powder prepared by the process according to the present invention can reduce the generation of the gases to a great extent.

Although the details of action and mechanism are not yet clarified, it can be noted herein as will be apparent from the foregoing description that the coating of the indium on the surface of the zinc alloy powder provides two actions, i.e. elevating the hydrogen overvoltage on the surface of the zinc alloy powder to suppress gases from generating due to corrosion during storage as dry cells and maintaining good contact among the zinc alloy powder particles to provide good discharge performance.

The present invention will be described more in detail by way of examples with reference to the comparative and the accompanying drawings.

Preparation of zinc alloy powder:

Zinc having the purity of 99.995% by weight or higher was molten at approximately 500° C. and at least one of lead, bismuth, aluminum and calcium was added to the molten zinc, thereby yielding a zinc alloy which in turn was pulverized by spraying method using high pressure gases. The pulverized zinc alloy was then screened yielding zinc alloy powder having predetermined particle sizes.

The resulting zinc alloy powder having the predetermined particle sizes was placed in a mixer equipped with a heating device, together with a predetermined amount of indium particles. The mixer was then replenished with nitrogen or argon gas working as a non-oxidizable gas and heated at approximately 160° C. to 200° C. for one hour.

EXAMPLE 1

Figure 2:
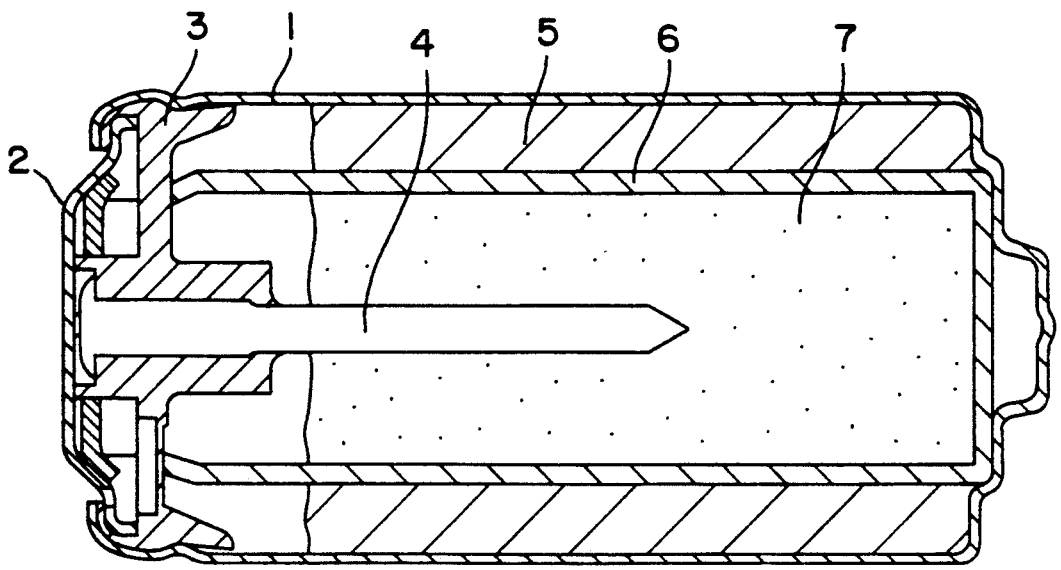
FIG. 2 is a sectional view showing a cell of an LR6 type.

A cell of LR6 type as shown in FIG. 2 was prepared by using a zinc alloy powder which was prepared by coating the zinc alloy powder with indium so as to contain the indium in the amount of 0.10% by weight.

Referring to FIG. 2, the cell is shown to comprise a cathode can 1, an anode terminal 2, sealing body 3, an anode current collector 4, a cathode active substance 5, a separator 6, and a zinc alloy anode 7. The cathode active substance 5 was prepared by forming a mixture of black lead with manganese dioxide under pressure into a predetermined shape. The zinc alloy anode 7 was prepared by saturating zinc oxide with a 40% by weight KOH aqueous solution into an electrolytic solution which in turn was gelled with polyacrylic acid and others and which was then dispersed with zinc alloy powder.

COMPARATIVE EXAMPLE 1

A cell of LR6 type as shown in FIG. 2 was formed in substantially the same manner as in Example 1 from a zinc alloy which was prepared by uniformly alloying pure zinc powder containing one of lead, aluminum, bismuth and calcium with indium so as to contain the indium in the amount of 0.10% by weight.

COMPARATIVE EXAMPLE 2

A cell of LR6 type as shown in FIG. 2 was prepared in the same manner as in Example 1, except for using conventional zinc alloy powder amalgamated with an indiummercury alloy (indium, 0.02% by weight; lead, 0.05% by weight; aluminum, 0.05% by weight; mercury, 0.6% by weight).

COMPARATIVE EXAMPLE 3

A cell of LR6 type as shown in FIG. 2 was formed in substantially the same manner as in Example 1, except for using pure zinc powder.

Table 1 below shows the results of discharge performance measured at 3.9 ohms and at the terminal voltage of 0.9 volts.

TABLE 1

| Samples | Discharge Duration Time (hr) |
| --- | --- |
| Example 1 | 5.22 |
| Comparative Example 1 | 3.80 |
| Comparative Example 2 | 5.25 |
| Comparative Example 3 | 2.80 |

As is apparent from the results as shown in Table 1 above, it has been found that the indium-coated zinc alloy powder prepared by the process according to the present invention is equal to conventional amalgamated zinc in discharge performance, and alloying pure zinc with indium and the pure zinc is worse than indium-coated zinc alloy in discharge performance.

EXAMPLE 2

In order to determine the optimum amount range of indium to be coated on the surface of the zinc alloy powder, varying amounts of indium were added to the zinc alloy powder.

The resulting zinc alloy powder was tested for the amount of gases generated while stored at 60° C. for 30 days by immersing 10 grams of the zinc alloy powder sample in 5 ml of an electrolytic solution prepared by saturating a 40% by weight KOH aqueous solution with zinc oxide.

For comparative purposes, the amalgamated zinc prepared in Comparative Example 2 and the pure zinc prepared in Comparative Example 3 were likewise tested in the same manner as above.

As is apparent from FIG. 1, it is found preferable that the level of indium ranges from approximately 0.05% to 0.80% by weight because the amount of gases generated is particularly low in this range.

EXAMPLE 3

Using the zinc alloy powder prepared in the same manner as in Example 1 by alloying zinc with at least one of lead, bismuth, aluminum and calcium so as to contain the indium in the amount of 0.10% by weight, the test for determining the amount of gases generated was carried out in the same manner as in Example 2.

For comparative purposes, the amalgamated zinc prepared in Comparative Example 2 and the pure zinc prepared in Comparative Example 3 were likewise tested in the same manner as above.

TABLE 2

| Samples | Amount of Gases ($\mu$ l/gram/day) |
| --- | --- |
| Zn—In | 0.30 |
| Zn—In—Al(0.02 wt %) | 0.16 |
| Zn—In—Bi(0.02 wt %) | 0.20 |
| Zn—In—Ca(0.02 wt %) | 0.16 |
| Zn—In—Pb(0.05 wt %) | 0.15 |
| Zn—In—Pb(0.05 wt %)—Al(0.02 wt %) | 0.09 |
| Zn—In—Pb(0.05 wt %)—Bi(0.02 wt %) | 0.07 |
| Zn—In—Pb(0.05 wt %)—Ca(0.02 wt %) | 0.09 |
| Zn—In—Bi(0.02 wt %)—Ca(0.02 wt %) | 0.09 |
| Comparative Example 2 (Amalgamated zinc) | 0.12 |
| Comparative Example 3 (Pure zinc) | 0.80 |

As is apparent from Table 2 above, it has been found preferable that at least one of aluminum, bismuth, calcium and lead be employed together with indium in order to suppress gases from generating to such a level as lower than or substantially equal to conventional amalgamated zinc.

EXAMPLE 4

The zinc alloy powder was prepared by adding approximately 0.10% by weight of indium to zinc alloy powder {Zn-Pb(0.05% by weight)-Bi(0.02% by weight)} in nitrogen atmosphere at 160° C. and three samples of the zinc alloy powder were collected from one lot. The samples were then measured for the content of indium by atomic absorptiometry and for the content of zinc oxide by measuring the amount of the zinc dissolved in a mixture of ammonium chloride with ammonium hydroxide by atomic absorptiometry. The three samples were further tested for the amount of gases generated in the same manner as in Examples 1 to 3 and discharge performance (at 3.9 ohms and at the terminal voltage of 0.9 volts). The results are shown in Table 3 below.

EXAMPLE 5

The zinc alloy powder was prepared in substantially the same manner as in Example 4, except for heating at 180° C., and three samples were tested in the same manner as in Example 4. The test results are shown in Table 3 below.

EXAMPLE 6

The procedures were repeated in substantially the same manner as in Example 4, except for heating at 200° C., and three samples were likewise tested. The test results are shown in Table 3 below.

COMPARATIVE EXAMPLE 4

The zinc alloy powder was prepared in substantially the same manner as in Example 4, except for heating at 158° C., and three samples were tested in the same manner as in Example 4. The test results are shown in Table 3 below.

COMPARATIVE EXAMPLE 5

The zinc alloy powder was prepared in substantially the same manner as in Example 4, except for heating at 210° C., and three samples were tested in the same manner as in Example 4. The test results are shown in Table 3 below.

EXAMPLE 7

The procedures were repeated in substantially the same manner as in Example 4, except for heating at 180° C. in argon atmosphere, and three samples were likewise tested. The test results are shown in Table 3 below.

COMPARATIVE EXAMPLE 6

The zinc alloy powder was prepared in substantially the same manner as in Example 4, except for heating at 180° C. in air, and three samples were tested in the same manner as in Example 4. The test results are shown in Table 3 below.

TABLE 3

|  | In (%) | ZnO (%) | Amount of Gases* | Discharge Duration Time (hr) |
| --- | --- | --- | --- | --- |
| Example 4 | 0.10 | 0.11 | 0.07 | 5.23 |
|  | 0.10 | 0.11 | 0.07 | 5.25 |
|  | 0.11 | 0.13 | 0.07 | 5.25 |
| Example 5 | 0.10 | 0.11 | 0.07 | 5.24 |
|  | 0.10 | 0.12 | 0.07 | 5.24 |
|  | 0.10 | 0.12 | 0.07 | 5.24 |
| Example 6 | 0.10 | 0.12 | 0.07 | 5.23 |
|  | 0.10 | 0.12 | 0.07 | 5.23 |
|  | 0.11 | 0.12 | 0.07 | 5.23 |
| Example 7 | 0.10 | 0.12 | 0.07 | 5.23 |
|  | 0.10 | 0.13 | 0.07 | 5.24 |
|  | 0.10 | 0.13 | 0.07 | 5.27 |
| Comparative Example 4 | 0.05 | 0.11 | 0.09 | 5.15 |
|  | 0.09 | 0.11 | 0.07 | 5.24 |
|  | 0.15 | 0.11 | 0.07 | 5.24 |
| Comparative Example 5 | 0.10 | 0.11 | 0.07 | 4.70 |
|  | 0.10 | 0.12 | 0.07 | 4.75 |
|  | 0.10 | 0.12 | 0.07 | 4.75 |
| Comparative Example 6 | 0.10 | 0.35 | 0.28 | 5.05 |
|  | 0.10 | 0.36 | 0.28 | 5.10 |
|  | 0.10 | 0.36 | 0.30 | 5.10 |

Note: *) unit = $\mu$ l per gram per day

As is apparent from Table 3 above, it is found that the amount of zinc oxide can be lowered by 0.2% to 0.3% by weight and the amounts of the gases generated can be reduced to an extraordinary extent when an inert gas such as nitrogen or argon is employed, as compared with when air is employed. Further, it has been found that the indium level may become irregular at varying location of sampling, when the zinc alloy powder is heated at temperatures lower than 160° C., on the one hand, while the discharge performance may be lowered rapidly when the zinc alloy powder is heated at temperatures higher than 200° C., on the other hand.

As described hereinabove, the zinc alloy powder prepared by the process according to the present invention can improve currently increasing environmental pollution caused by mercury contained in alkali cells and, at the same time, it can provide cells advantageous from the point of view of recycling resources.

What is claimed is:

1. A process for preparing non-amalgamated zinc alloy powder for alkali dry cells, comprising admixing zinc alloy powder with a predetermined amount of indium and heating a mixture of the zinc alloy powder with indium at a predetermined temperature in an atmosphere of an inert gas for the purpose of coating the zinc alloy powder with the indium.

2. A process for preparing non-amalgamated zinc alloy powder as claimed in claim 1, wherein indium is added to the zinc alloy powder in such an amount as accounting for 0.05% to 0.80% by weight.

3. A process for preparing non-amalgamated zinc alloy powder as claimed in claim 1, wherein the zinc alloy powder with the indium added thereto is heated at temperature ranging from approximately 160° C. to 200° C.

4. A process for preparing non-amalgamated zinc alloy powder as claimed in claim 1, wherein the inert gas is nitrogen or argon.

5. A process for preparing non-amalgamated zinc alloy powder as claimed in claim 1, wherein the zinc alloy powder further contains at least one of lead, aluminum, bismuth and calcium.

6. A process for preparing non-amalgamated zinc alloy powder as claimed in claim 1, wherein the zinc alloy powder is first mixed with the indium and then heated at a temperature ranging from approximately 160° C. to 200° C.

* * * * *